United States Patent [19]

Swanson et al.

[11] Patent Number: 5,276,425
[45] Date of Patent: Jan. 4, 1994

[54] METHOD FOR BROADCASTING IN CLOS SWITCHING NETWORKS BY LIMITING THE NUMBER OF POINT-TO-MULTIPOINT CONNECTIONS

[75] Inventors: Carol J. Swanson, Aberdeen; Daniel P. T. Wang, Marlboro; Peter B. Zhou, Manalapan, all of N.J.

[73] Assignee: AT&T Bell Laboratories, Murray Hill, N.J.

[21] Appl. No.: 794,548

[22] Filed: Nov. 19, 1991

[51] Int. Cl.⁵ ............................................. H04Q 1/00
[52] U.S. Cl. ............................. 340/826; 340/825.03; 340/825.8; 370/94.1; 370/60.1
[58] Field of Search .............. 340/826, 825.03, 825.79, 340/825.8; 370/581, 60, 60.1, 94.3

[56] References Cited

U.S. PATENT DOCUMENTS 4,696,000 9/1987 Payne, III ............................ 370/60
4,975,909 12/1990 Masson ............................... 370/94.3

OTHER PUBLICATIONS

"Generalized Multi-Stage Connection Networks" by G. M. Masson & B. W. Jordan. Networks, 2: pp. 191-209, 1972 by John Wiley and Sons, Inc.
"Rearrangeability of Multi-Connection Three-Stage Clos Networks" by F. K. Hwang. Networks, 2: pp. 301-306, 1972 by John Wiley and Sons, Inc.
"A Two-Stage Rearrangeable Broadcast Switching Network" by Gaylord W. Richards and Frank K. Hwang. IEEE Transactions on Communications, vol. COM-33, No. 10, Oct., 1985, pp. 1025-1035.
"The Rearrangement Process in a Two-Stage Broadcast Switching Network" by Soren B. Jacobsen, IEEE Transactions on Communications, vol. 36, No. 4, Apr., 1988.
The Bell System Technical Journal, vol. XXXII, Jan., 1953, No. 1 "A Study of Non-Blocking Switching Networks by Charles Clos", pp. 406-424.

Primary Examiner—Donald J. Yusko
Assistant Examiner—Brian Zimmerman
Attorney, Agent, or Firm—Eugene J. Rosenthal; Ronald D. Slusky

[57] ABSTRACT

A process that disallows any bridging onto the signal to be broadcast from any switch of the input stage of the Clos switching network and that further disallows any requests for point-to-multipoint broadcast connections in excess of the number of switches in the center stage of the network avoids the perceived problems with maintaining point-to-multipoint broadcast connections in a Clos switching network. Such a process causes rearranging to occur only when the broadcast connection is established or added to. It also guarantees that paths for point-to-point connections can always be found, when they are requested, without spending time to rearrange any other connection.

17 Claims, 7 Drawing Sheets

METHOD FOR BROADCASTING IN CLOS SWITCHING NETWORKS BY LIMITING THE NUMBER OF POINT-TO-MULTIPOINT CONNECTIONS

TECHNICAL FIELD

This invention relates to Clos switching networks and, more particularly, to the establishing of point-to-multipoint connections therein.

BACKGROUND OF THE INVENTION

As is well known in the art, a Clos switching network is a network of switches that is architected in a multi-stage configuration so that fewer switching points are necessary to implement connections between its inputs and outputs than would be required by a single stage switch architecture having the same input and output structure. In the prior art, three-stage Clos switching networks have been typically prevented from providing point-to-multipoint broadcasting. This is because it was known that to allow such broadcasting would tend to introduce the blocking of attempts to later establish point-to-point connections, unless the network were continually rearranged. However, the effort and time required to continually rearrange such a network, in order to maintain its nonblocking characteristics, when providing point-to-multipoint broadcasting, were perceived to be prohibitive.

And indeed, the maintenance of such nonblocking characteristics is often regarded as very important. For example, it is especially important for Clos switching networks that are to assist in providing alternate paths for use in the rerouting of signals which are carried over transport paths that become disturbed. Such alternate paths are carried through the Clos switching network via point-to-point connections and it must be ensured, for well known reasons in the switching art, that only a short time be taken to establish these alternate paths. To ensure that the time taken to establish the alternate paths is short, it is necessary that each one of the point-to-point connections, which must be established through the Clos switching network to support the alternate paths, be immediately available. Such immediate availability can only be achieved if the point-to-point nonblocking characteristics of the Clos switching network are maintained. However, as noted above, the maintenance of such nonblocking characteristics was perceived to limit the ability of the Clos switching network to be reconfigured, and hence, to limit its ability to support point-to-multipoint broadcasting.

SUMMARY OF THE INVENTION

The perceived problems with maintaining point-to-multipoint broadcast connections in a Clos switching network are avoided, in accordance with the principles of the invention, by disallowing any bridging onto the signal to be broadcast from any switch of the input stage of the Clos switching network and by disallowing any requests for point-to-multipoint broadcast connections in excess of the number of switches in the center stage of the network. Such a disallowance causes rearranging to occur only when the broadcast connection is established or added to. It also guarantees that paths for point-to-point connections can always be found, when they are requested, without spending time to rearrange any other connection. An advantage of this disallowance is that, at most, one previously existing connection will need to be rearranged in order to add an output point to each broadcast connection. Furthermore, at most two previously existing point-to-point connections will need to be rearranged in order to establish the initial output point of the broadcast connection. Therefore, a maximum of only M+1 already existing connections, where M is the number of switches in the output stage of the Clos switching network, need to be rearranged during the process of establishing a broadcast connection. Since M+1 is a number that is small enough to be manageable, an improvement is realized over the prior art.

In a preferred embodiment of the invention, a point-to-multipoint broadcast connection is established by adding one additional output point to the connection at a time, in an iterative fashion, after an initial point-to-point connection is established, in accordance with the a sequence of steps. Each step is executed for each output point to be added to the broadcast connection until a step is reached in which an attempt to bridge that output point onto the connection is successful. The steps are as follows: 1) attempt to establish the bridging required for the current output point at a switch of the output stage to which the signal being broadcast already reaches; 2) if the required bridging cannot be established at a switch of the output stage, attempt to establish the necessary bridging at the switch in the center stage through which the initial point-to-point connection for the signal being broadcast is established; 3) if a bridge can not be successfully established at the switch of the center stage, because the necessary point of connection from that switch to the switch in the output stage connected to the output point is unavailable, rearrange the network connections by moving, to another switch of the center stage, the point-to-point connection, which is currently causing the point of connection, from the switch of the center stage, that is required for the broadcast to be busy; 4) establish the bridging required for the current output point at the switch of the center stage and use the just freed path to connect the bridged signal from that switch to the switch of the output stage connected to the output point.

DETAILED DESCRIPTION

Figure 1:
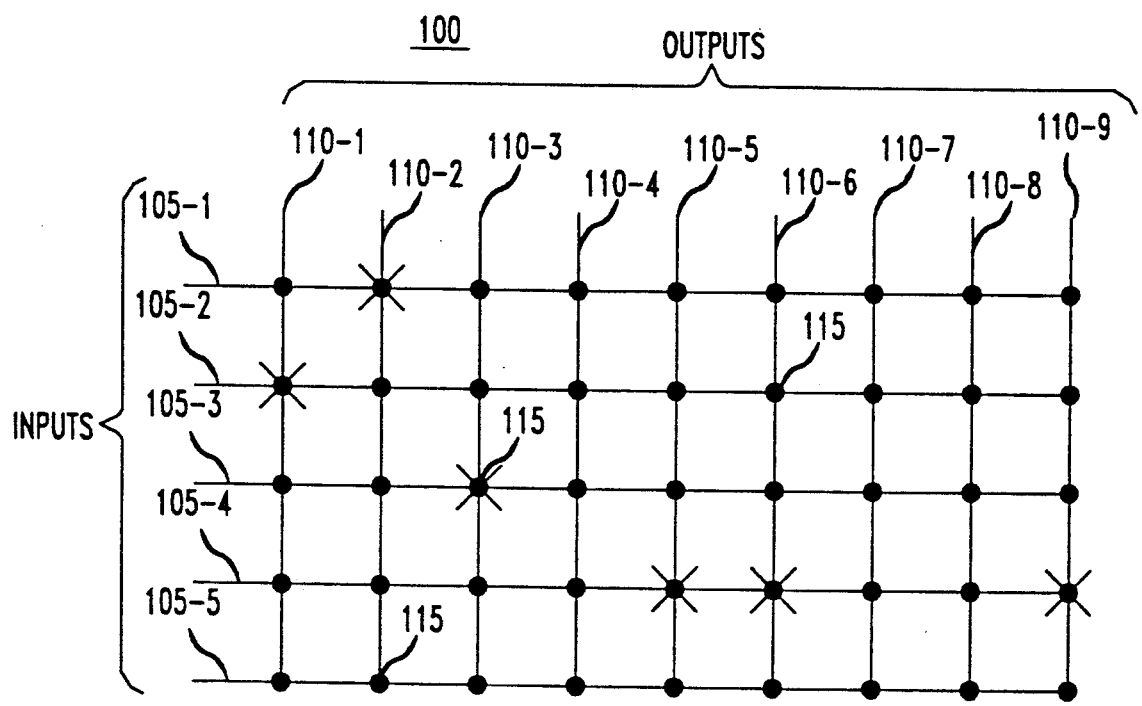
FIG. 1 shows a crosspoint switch array having 5 input points and 9 output points.

Shown in FIG. 1 is 5×9 crosspoint switch array 100 having 5 input points 105, designated 105-1 through 105-5, and 9 output points 110, designated 110-1 through 110-9. Crosspoint switches 115, for connecting one of input points 105 to one of output points 110, are each represented by a dot. Provided that the number of input points 105 is less than or equal to the number of output points 110, for a crosspoint switch array of this type, a connection can always be made from an unused one of input points 105 to an unused one of output points 110 via one of crosspoint switches 115.

A switching arrangement that always permits a connection to be made from an unused input point to an unused output point is referred to as a nonblocking switch. Crosspoint switch array 100 is one such nonblocking switch. An indication of the complexity of a nonblocking switch, and hence an indication of its cost, is the number of crosspoints needed so that any unused input can be connect to any unused output. For single stage crosspoint switch arrays, this number is generally the product of the number of input points and the number of output points.

The "X" marking several of crosspoint switches 115 indicates that those of crosspoint switches 115 so marked are closed and are actually interconnecting at least some of input points 105 to output points 110. The unmarked ones of crosspoint switches 115 are open and, therefore, are not interconnecting any of input points 105 to any of output points 110. Thus, input point 105-1 is connected to output point 110-2, input point 105-2 is connected to output point 110-1, input point 105-3 is connected to output point 110-3. Each of these connections is referred to as a point-to-point connection because it connects only one of input points 105 to one of output points 110.

Input point 105-4 is connected to output points 110-5, 110-6 and 110-9. This type of connection is known as a point-to-multipoint broadcast connection-hereinafter referred as a "broadcast"—because more than one of output points 110 is connected to a single one of input points 105. This allows the signal supplied at the single one of input points 105 to be supplied to all of output points 110 that are connected to that input point. Each such connection beyond the first is referred to as a "bridge". The process of establishing a bridge is referred to as "bridging".

Input point 105-5 is idle and not connected to any of output points 110.

It was shown by C. Clos of Bell Laboratories, and is now well known in the art, that the complexity of a nonblocking switch can be significantly reduced by employing a multi-stage network architecture to provide the necessary switching. Such a reduced complexity is beneficial in that the cost of providing the required nonblocking switch is reduced.

Figure 2:
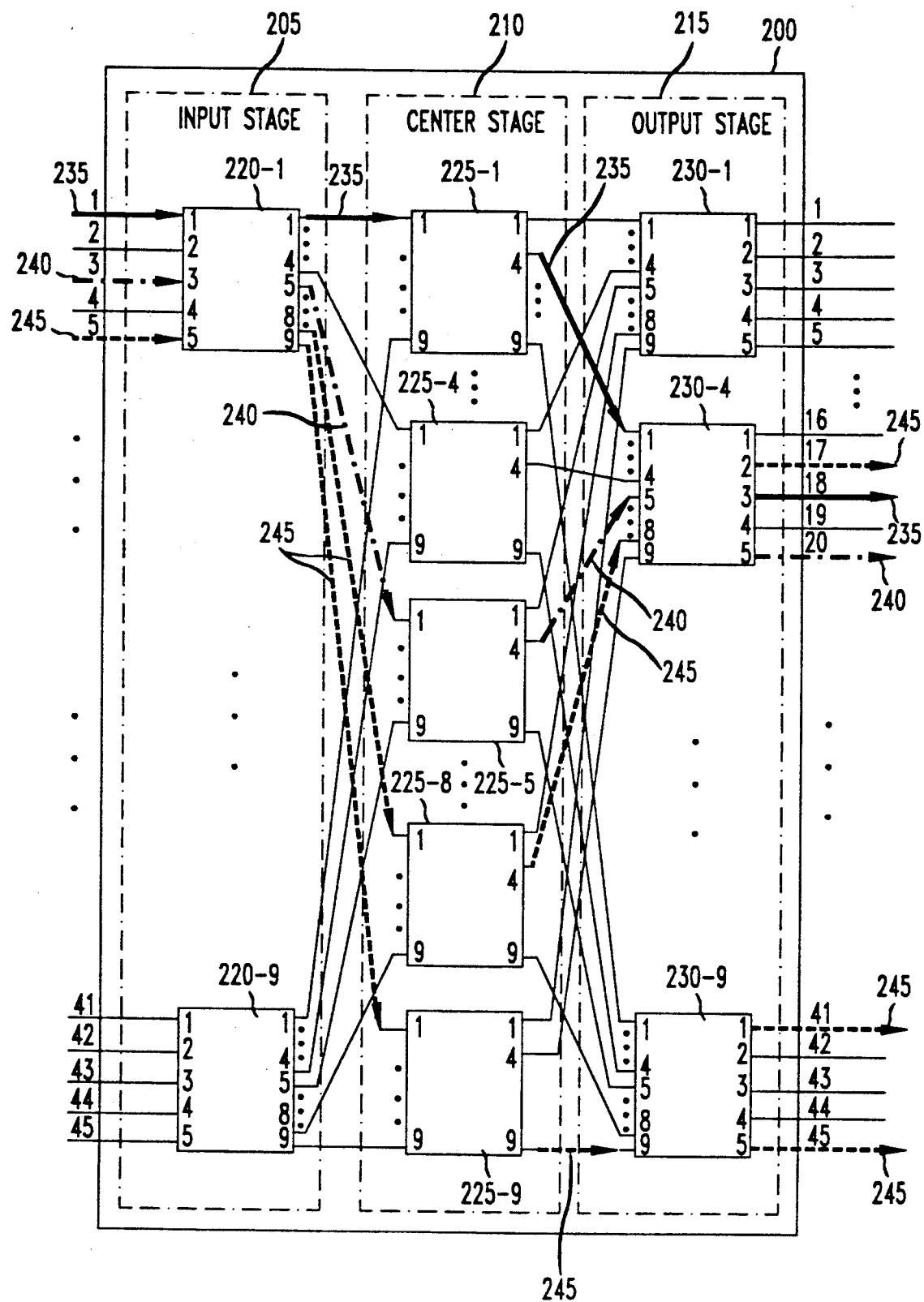
FIG. 2 shows a three stage Clos switching network configured according to the Clos architecture having point-to-multipoint broadcast connections configured in accordance with the prior art.

Shown in FIG. 2 is three stage switching network (Clos switching network) 200 which is configured according to the Clos architecture and has 45 input points and 45 output points. As shown, input stage 205, center stage 210 and output stage 215 each have nine crosspoint switch arrays. In particular, input stage 205 includes switches 220-1 through 220-9; center stage 210 includes switches 225-1 through 225-9; and output stage 215 includes switches switches 230-1 through 230-9. Each of the switches of input stage 205 (which are referred to as input stage switches 220) is a 5×9 crosspoint switch array such as crosspoint switch array 100. Each of the switches of center stage 210 (which are referred to as center stage switches 225) is a 9×9 crosspoint switch array. Each of the switches of output stare 215 (which are referred to as output stage switches 230) is an 9×5 crosspoint switch array.

Inputs to each of switches 220, 225 and 230 are shown to be on the left side of the individual switches. Outputs from each of switches 220, 225 and 230 are on the right side of the individual switches. In the manner shown, the 45 inputs to Clos switching network 200 are divided into groups of 5 inputs, each member of a group of 5 inputs to Clos switching network 200 being colocated with an input of one of input stage switches 220. In a similar manner, the 45 outputs from Clos switching network 200 are divided in groups of 5 outputs, each member of a group of 5 outputs from Clos switching network 200 being colocated with an output of one of output stage switches 230.

The total number of crosspoint switches that are required for Clos switching network 200 is $9 \times (5 \times 9) + 9 \times (9 \times 9) + 9 \times (9 \times 5) = 1539$. This is approximately a 25% reduction from the number of crosspoint switches that would be required by a comparably sized single stage crosspoint switch array which would be $45 \times 45 = 2025$.

Each of the output points of each one of input stage switches 220 is connected to an input point of a different one of center stage switches 225 in the same relative position as that particular one of input stage switches 220 is positioned within input stage 205, i.e., output point X of switch 220-Y is connected to input point Y of switch 225-X for $X = 1, 2, \ldots, 9$ and $Y = 1, 2, \ldots 9$. Thus, in the manner shown, each of the first output points of each of input stage switches 220 is connected to the first input point of the one of switches 225 in center stage 210 having the same reference numeral suffix as the number of the output point. Similarly, each of the second output points of each of input stage switches 220 is connected to the second input point of the one of switches 225 in center stage 210 having the same reference numeral suffix as the number of the output point, etc. Similar connections are made between the output points of center stage switches 225 and the input points of output stage switches 230.

Also shown in FIG. 2 are point-to-point connections 235 and 240 each of which causes one input point of Clos switching network 200 to be connected to only one output of Clos switching network 200. Point-to-point connection 235 connects the first input point of input stage switch 220-1 to the third output point of output stage switch 230-4. Point-to-point connection 240 connects the third input point of input stage switch 220-1 to the fifth output point of output stage switch 230-4.

Broadcast 245 is also shown in FIG. 2. Broadcast 245 is interconnects the fifth input point of input stage switch 220-1 to the second output point of output stage switch 230-4 and to the first and fifth output points of output stage switch 230-9. Two bridges exist established in input stage switch 220-1, center stage switch 225-8, center stage switch 225-9, and in output stage switches 230-4 and 230-9. In accordance with the principles of the invention, bridging onto the signal to be broadcasted from any switch of the input stage of a Clos switching network is not permitted, and furthermore, requests to establish broadcasts in excess of the number of switches in the center stage of the network are denied. Niether of these criteria is met by the prior art arrangement of FIG. 2. In particular, the existence of the bridge in input stage switch 220-1 violates the first criterion. Moreover, it is assumed herein—although for clarity purposes not explicitly shown—that there are are nine other broadcasts currently established in Clos switching network 200. Thus, there are, in total, 10 broadcasts, and the number of broadcasts exceeds the number of center stage switches 225, violating the second criterion.

The limitations on the establishment of bridges and on the permissible number of broadcasts, in accordance with the invention, causes rearranging to occur only when a broadcast connection is established or added to. These limitations also guarantee that paths for point-to-point connections can always be found, when they are requested, without spending time to rearrange any other connection. A further advantage of imposing these limitations on broadcasts is that, as will be shown below, at most, one previously existing connection will need to be rearranged in order to add an output point to each established broadcast. Furthermore, at most two previously existing point-to-point connections will need to be rearranged in order to connect the initial output point of the broadcast to the input point of the broadcast. Therefore, a maximum of only $M+1$ already existing connections, where M is the number of switches in the output stage of the Clos switching network, need to be rearranged during the process of establishing a broadcast. Since $M+1$ is a number that is small enough to be manageable, an improvement is realized over the prior art.

Figure 3:
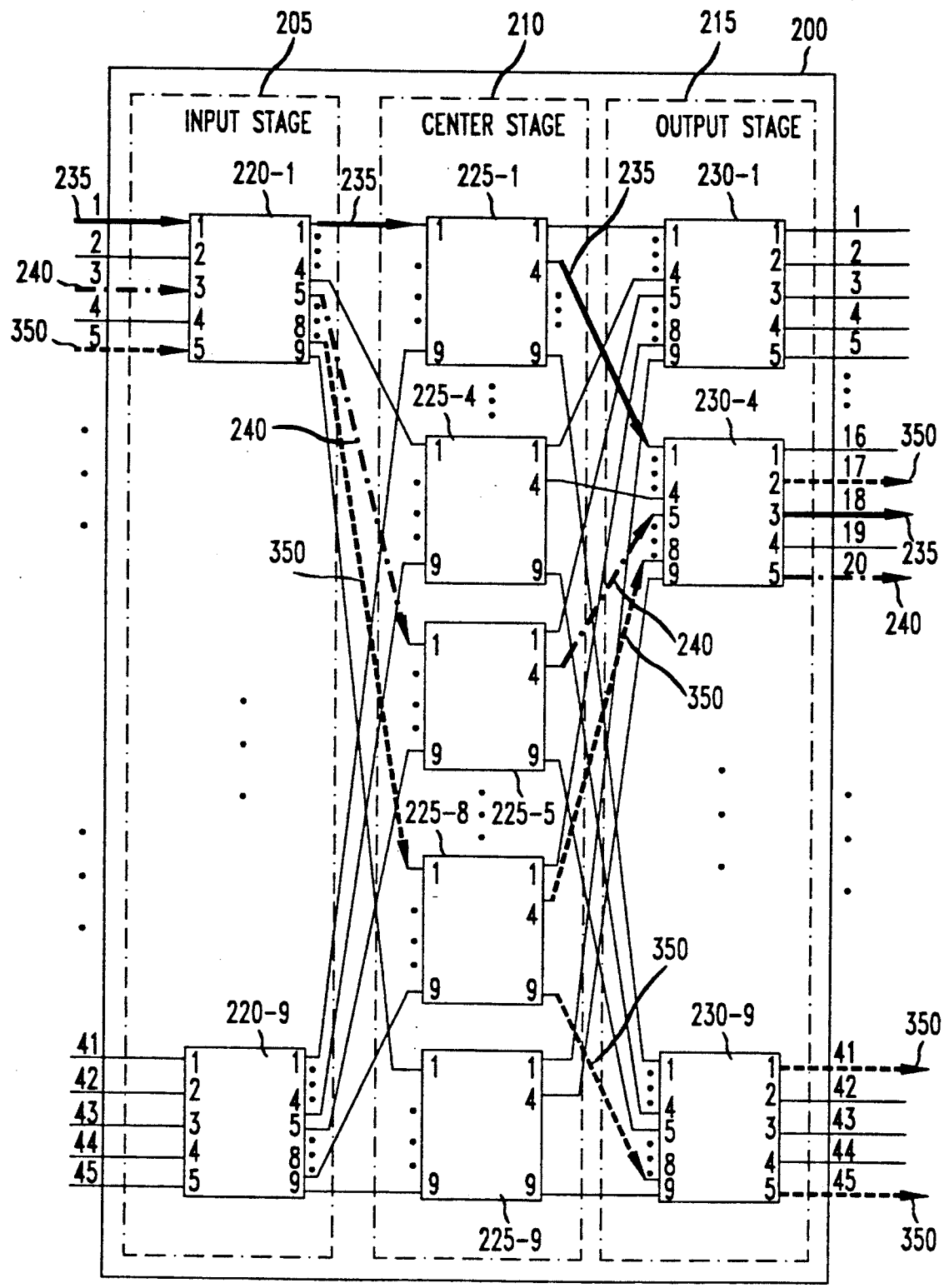
FIG. 3 shows the same Clos switching network as shown in FIG. 2 but having point-to-multipoint broadcast connections configured in accordance with the principles of the invention.

Shown in FIG. 3 is Clos switching network 200 with broadcast 350 configured in accordance with the principles of the invention. Point-to-point connections 235 and 240 are again shown in FIG. 3. Also present, but not shown for clarity purposes, are eight other broadcasts, each of the eight passing through a different one of center stage switches 225, other than center stage switch 225-5, on a one-broadcast-per-center-stage basis. Furthermore, in accordance with the principles of the invention, none of the other eight broadcasts is bridged at any of input stage switches 220.

Broadcast 350 is arranged to interconnect the same input and output points of Clos switching network 200 as were connected by broadcast 245 (FIG. 2). There is a bridge established in center stage switch 225-8, as well as a bridge established in output stage switches 230-9. Because there is no bridging of the signal to be broadcast at the input stage and the number of broadcasts established in Clos switching network 200 does not exceed the number of center stage switches 225, broadcast 350 is arranged in accordance with the principles of the invention.

Figure 4:
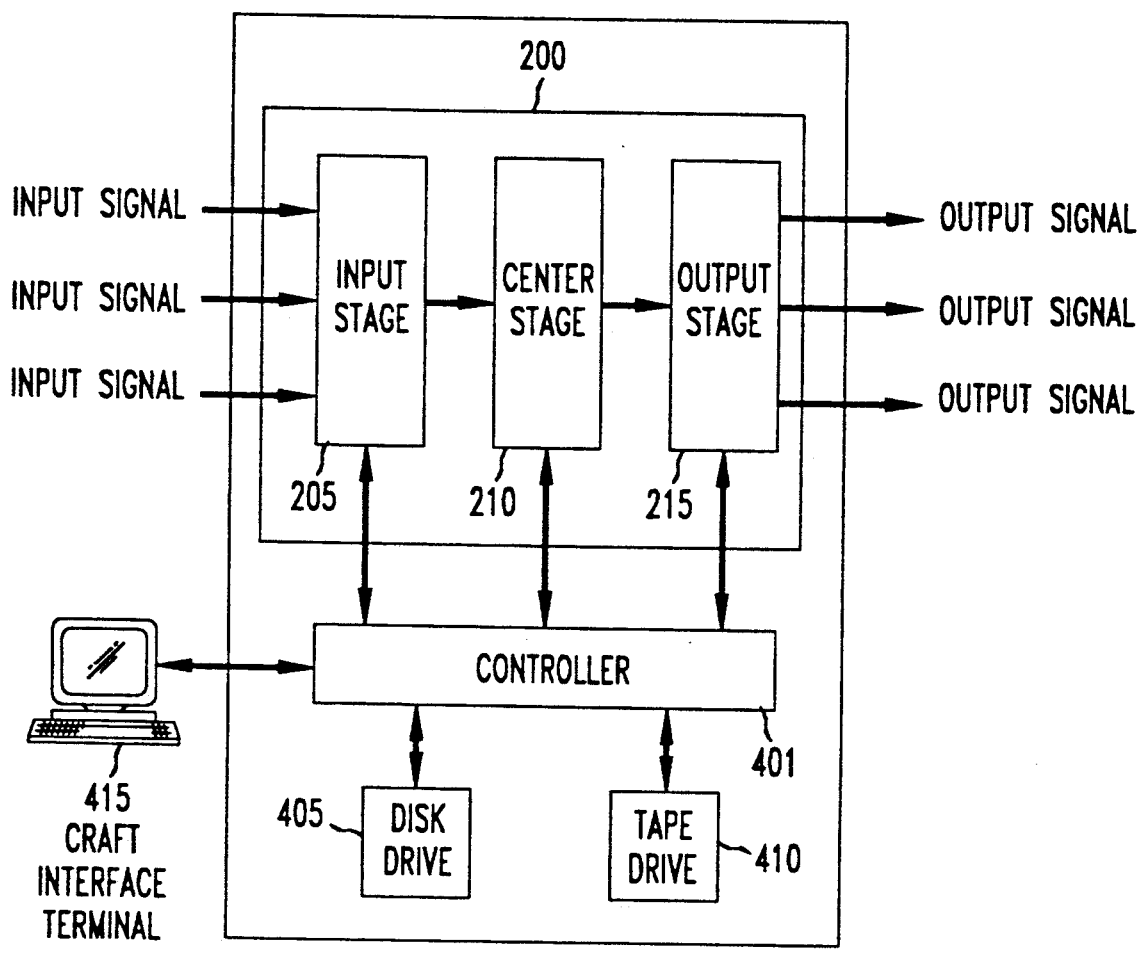
FIG. 4 shows a simplified schematic view of the same Clos switching network as shown in FIG. 2 as well as its associated controller.

FIG. 4 shows a simplified schematic representation of exemplary Clos switching network 200 and its associated controller 401. Controller 401 is responsible for controlling each of the switches in input stage 205, center stage 210 and output stage 215 so that connections through Clos switching network 200 are established and maintained. Controller 401 is a computer having input and output ports adapted for communicating with and controlling switches 220, 225 and 230 (FIG. 3) of Clos switching network 200. Such computers are well known in the art. Also shown in FIG. 4 are disk drive 405 and tape drive 410. Controller 401 can employ either of these long term non-volatile storage devices to maintain a record of the connections that are established in Clos switching network 200 so that such connections can be restored in the event of a power outage or other failure. Craft interface terminal 415 is used by the operator of Clos switching network 200 to instruct controller 401 of desired changes to the configuration of the connections in Clos switching network 200. Therefore, craft interface terminal 415 can be used to specify that a broadcast is to be established or added to and what the input point and outputs points of such broadcasts are to be. Craft interface terminal 415 can also be used to specify the input point and outputs point for point-to-point connections.

Figure 5:
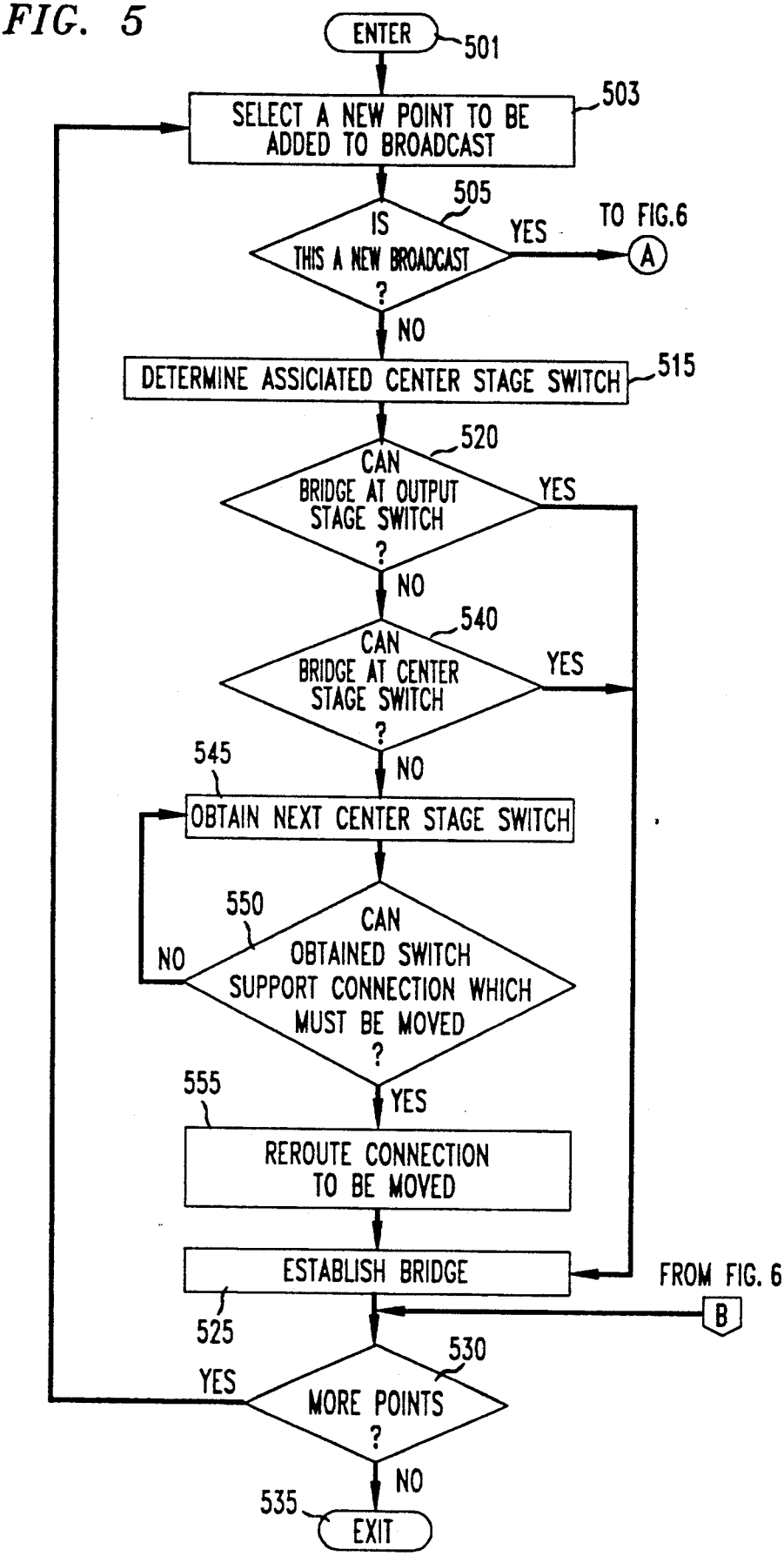
FIGS. 5 and 6, when connected together, show a flow chart of an exemplary process for either initially establishing a point-to-multipoint broadcast connection or adding an output point to an already existing point-to-multipoint broadcast connection in a Clos switching network in accordance with the principles of the invention.
Figure 6:
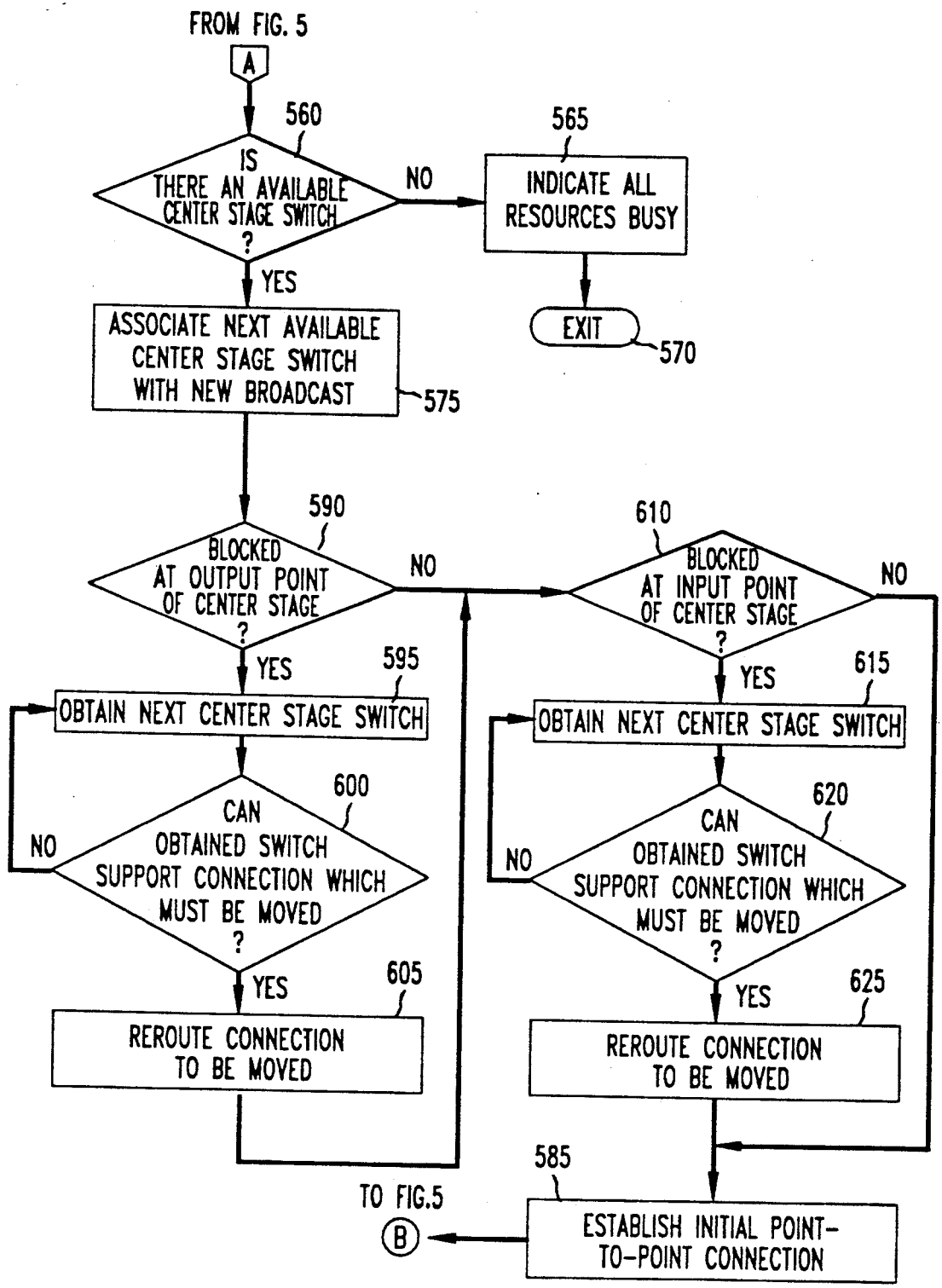

FIGS. 5 and 6, when connected together, show a flow chart of an exemplary process, embodying the principles of the invention, for either initially establishing a broadcast or adding an output point to an already existing broadcast in a Clos switching network. The process is illustratively executed by a controller that controls the connections of the Clos switching network. One commercially available Clos switching network is the DACS HI-2000, available from AT&T. The process is entered in step 501. The input point of the Clos switching network, at which the signal to be broadcast is supplied, as well as the set of initial or additional output points of the Clos network, from which the signal will be broadcast, are made known to the process in step 501. These input and output points are specified as part of the command which causes the process to be executed.

In step 503, a new output point, from those in the supplied set, is selected. Thereafter, conditional branch point 505 tests to determine if a new broadcast is being established, i.e., there are no previously existing connections through the Clos network to any output point of the Clos switching network from the input point, to the Clos switching network, of the signal to be broadcast.

If the test result in step 505 is NO, an already established broadcast is being expanded to so as to supply the signal being broadcasted to additional output points. As such, there is already a switch of the center stage of the Clos switching network (center stage switch) associated with the established broadcast. Control is, therefore, passed to step 515, in which the center stage switch that is associated with the broadcast is determined. Thereafter, conditional branch point 520 tests to determine if the output point selected in step 503 to be added to the broadcast can be bridged onto the signal to be broadcast at the switch of the output stage of Clos switching network 700 (output stage switch) that is connected to the output point. If the test result in step 520 is YES, control is passed to step 125 which establishes the necessary bridge in the output stage switch. Control is then passed to conditional branch point 530, which tests to determine if there are more output points to be added to the broadcast. If the test result in step 530 is NO, control is passed to step 135 and the process is exited. If the test result in step 530 is YES, control is passed back to step 503.

If the test result in step 520 is NO, control is passed to conditional branch point 540, which tests to determine if the required bridge can be established at the associated center stage switch. If the test result in step 540 is YES, control is passed to step 525, which causes the required bridge is established in the associated switch of the center stage. Thereafter the process continues as described above.

If the test result in step 540 is NO, the output point necessary on the associated center stage for supplying the signal to the selected output stage switch connected to the output point is unavailable i.e. it is blocked by an already existing point-to-point connection. Therefore, in accordance with the principles of the invention, instead of attempting to establish the bridge at the input stage, as in the prior art, the point-to-point connection will be rerouted and the necessary bridge will be achieved at the center stage switch. Toward the end of rerouting the point-to-point connection, which has caused the necessary output point of the center stage switch to be blocked, a search procedure is undertaken in steps 545, 550, and 555. This search procedure locates a center stage switch through which the point-to-point connection can be rerouted.

All the switches of the center stage have an associated switch number. The switch numbers are assigned consecutively from one (1) to the number of switches in the center stage. In step 545, the next consecutively numbered center stage switch from the center stage switch associated with the broadcast, is obtained. Conditional branch point 550 tests to deter-mine if the point-to-point connection, which must be moved from the switch of the center stage associated with tile broadcast, can be supported by the center stage switch obtained in step 545. In other words, are the respective input and output points of the obtained center stage switch, which would be used in connecting the signal to be moved to the input and output stage switches by means of which the point-to-point connection is connected to, of the Clos switching network, not in use. If the test result in step 550 is YES, control is passed to step 555, which rearranges the configuration of the Clos switching network so that the point-to-point connection, which must be moved, is rerouted through the obtained center stage switch.

An advantage of rearranging the configuration of the Clos switching network when output points are added to the broadcast, is that it becomes guaranteed that paths for point-to-point connections can always be found, when they are requested, without spending time to rearrange any other connections. A further advantage is that, at most, one previously existing connection will need to be rearranged in order to add any output points to each broadcast.

Thereafter, control is passed to step 525, in which the bridge necessary to add the selected output point is established in the center stage switch that is associated with the broadcast. The process then continues at step 530, as described above. If the test result in step 550 is NO, control is passed back to step 545, and the next consecutively numbered center stage switch, after the one just tried, is obtained. If the last of the center stage switches has been obtained, then the obtaining in step 545 wraps around to the first center stage switch.

If the test result in step 505 is YES, a new broadcast is being established. Therefore, control is passed to conditional branch point 560. In accordance with the principles of the invention, conditional branch point 560 tests to determine if there is an available center stage to support the broadcast i.e. are there already less broadcast connections than there are number of switches in the center stage. In accordance with an aspect of the invention, if the test result in step 560 is NO, control is passed to step 165, which indicates that the network is unable to support an additional broadcast and, therefore, the request for broadcast is rejected. The process is then exited in step 570.

If the test result in step 560 is YES, in accordance with an aspect of the invention, control is passed to step 575 in which the next available center stage switch is associated with the new broadcast to be established. In accordance with an aspect of the invention, in this exemplary embodiment, only one broadcast may be supported by any center stage switch. Therefore, to be available, a center stage switch must not already be supporting a broadcast. This requirement eliminates any possible need to move the broadcasts at a later time. Other embodiments, that permit the moving of broadcasts will be readily apparent to those skilled in the art.

It is possible that there exists at least one already existing point-to-point connection that is utilizing either the required input point or the required output point of the center stage switch, which was associated with the broadcast in step 575. If such conditions exist, in accordance with the principles of the invention, instead of backing the point of bridging to a switch of the input stage, as in the prior art, the connection(s) that are causing the blocking will be moved. Accordingly, it is necessary to determine if the point-to-point connection to be established is blocked at the output point of the center stage switch, the input point of the center stage switch or at both the input and the output points.

An advantage of this technique is that, at most two previously existing point-to-point connections will need to be rearranged in order to establish the initial output point of the broadcast. Also, since at most one previously existing connection will need to be rearranged in order to add an output point to each broadcast, a maximum of only $M+1$ already existing connections, where M is the number of switches in the output stage of the Clos switching network, need to be rearranged during the process of establishing a broadcast. Since $M+1$ is a number that is small enough to be manageable, an improvement is realized over the prior art.

Therefore, conditional branch point 590 tests to determine if the connection is blocked at the output point of the center stage switch. If the test result in step 590 is YES, control is passed to step 595, in which the next consecutively numbered center stage switch from the center stage switch associated with the broadcast is obtained. Conditional branch point 600 tests to determine if the point-to-point connection, which must be moved from the switch of the center stage associated with the broadcast, can be supported by the center stage switch obtained in step 595. If the test result in step 600 is YES, control is passed to step 605, which rearranges the configuration of the Clos switching network so that the point-to-point connection is rerouted through the obtained center stage switch. Thereafter, control is passed to conditional branch point 210. If the test result in step 600 is NO, control is passed back to step 595 and the next consecutively numbered center stage switch after the one just tried is obtained. If the last of the center stage switches has been obtained, then the obtaining in step 595 wraps around to the first center stage switch.

Conditional branch point 610 tests to determine if the connection is blocked at the input point of the center stage switch. If the test result in step 610 is YES, control is passed to step 615, in which the center stage switch next consecutively numbered from the switch associated with the broadcast is obtained. Conditional branch point 620 tests to determine if the point-to-point connection, which must be moved from the center stage switch associated with the broadcast, can be supported by the center stage switch obtained in step 615. If the test result in step 620 is YES, control is passed to step 625, which rearranges the configuration of the Clos switching network so that the point-to-point connection is rerouted through the obtained center stage switch. Thereafter, control is passed to step 585, and the initial point-to-point connection for the broadcast is established. The process then continues as described above at step 530 for any additional output points to be added to the broadcast.

Figure 7:
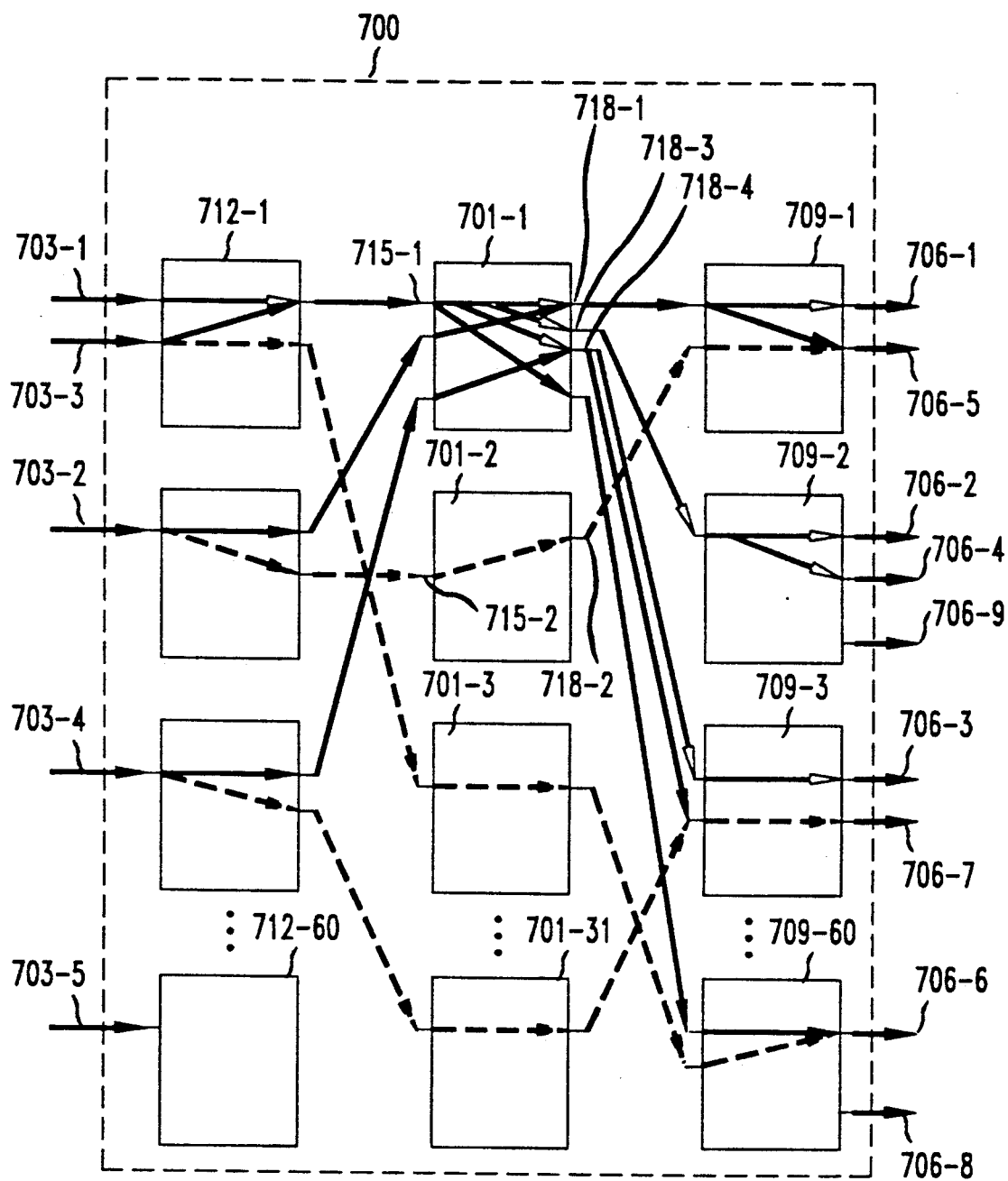
FIG. 7 shows an exemplary Clos switching network having 31 center stage switches for purposes of illustrating the process shown in FIGS. 5 and 6.

Shown in FIG. 7 is exemplary Clos switching network 700 having 31 center stage switches 701 which are designated center stage switches 701-1 through 701-31. The switch number is that portion of the reference numeral after the dash. Center stage switches 701 are 60×60 crosspoint switch arrays. Output stage 709 has 60 output stage switches designated output stage switches 709-1 through 709-60. Each switch of output stage 709 is a 31×16 crosspoint switch. Also, input stage 712 contains 60 input stage switches designated input stage switches 712-1 through 712-60. Each switch of input stage 712 is a 16×31 crosspoint switch.

It is assumed that 30 broadcasts are already established through Clos switching network 700. These 30 broadcasts are not shown for clarity purposes. These broadcasts are supported by center stage switches 701-2 through 701-31. Only center stage switch 701-1 does not support a broadcast. The operator of Clos switching network 700 desires to establish a broadcast from input point 703-1, of Clos switching network 700 to output points 706-1, 706-2, 706-3 and 706-4 of Clos switching network 700. Output points 706-1, 706-2, 706-3, 306-4 are located on output stage switches 309-1, 709-2, 709-3 and 709-2, respectively.

Accordingly, the process shown in FIG. 5 is entered in step 501. Input point 701 and output points 706-1, 706-2, 706-3 and 306-4 are supplied as inputs to the process. Initially output point 706-1 is selected in step 503 to be added to the broadcast. For purposes of this implementation, in step 503, the points to be added to a broadcast are selected in order of increasing reference numeral designation. Other methods of selecting from the output points supplied as inputs to the process, without replacement, will be readily apparent to those skilled in the art.

Since this is a new broadcast, the test result in conditional branch point 505 is YES, and control is passed to conditional branch point 560. It call be determined if a new broadcast is being established from the nature of command which invoked the process. Alternatively, each input point of a broadcast is associated with one of center stage switches 701 serving that broadcast and these can be searched. If no matching entry is found it is determined that a new broadcast is being established. Other methods for determining if a new broadcast is being established or an existing broadcast is having additional output points added thereto will be readily apparent to those skilled in the art.

In accordance with an aspect of the invention, since the number of broadcasts already established is less than the number of center stage switches 701, i.e., 31, at least one center stage switch is available to support the broadcast. Therefore, the test result in step 560 is YES. Thereafter, in step 575, the broadcast is associated with center stage switch 701-1, which is the only one of center stage switches 701 that is not already supporting a broadcast connection.

The initial connection of the broadcast that is to be established is the connection from input point 703-1 of Clos network 700 to selected output point 706-1, of Clos switching network 700. Conditional branch point 590 determines that there already exists a point-to-point connection through center stage switch 701-1 from input point 703-2, of Clos switching network 700, to output point 706-5, of Clos switching network 700. This connection is using output point 718-1, of center stage switch 701-1, which is necessary to support the connection of input point 703-1, of Clos network 700, to output point 706-1, of Clos switching network 700. Therefore, the test result in step 590 is YES, and control is passed to step 595, which obtains center stage switch 701-2, the next consecutively numbered center stage switch. Conditional branch point 600 tests to determine if center stage switch 301-2 can support a point-to-point connection from input point 703-2, of Clos switching network 700, to output point 706-5, of Clos switching network 700. Input point 715-2, of center stage switch 701-2, and output point 718-2, of center stage switch 701-2, are the necessary input and output points, of center stage switch 701-2, that must be available to support a connection from input point 703-2 to output point 706-5. Since they are not in use, the connection can be established. Therefore, in step 605 the connection from input point 703-2, of Clos switching network 700, through center stage switch 701-1 to output point 706-5, of Clos network 700, is taken down and in its place a connection is established from input point 703-2 though center stage switch 701-2 to output point 706-5.

Input point 715-1 of center stage switch 701-1 is also being used to support a point-to-point connection from input point 703-3, of Clos switching network 700, to output point 706-6, of Clos switching network 700. Therefore, input point 715-1, of center stage switch 301-1, is already being used. However, input point 715-1 must be available if center stage switch 701-1 is to connect the signal supplied at input point 703-1, of Clos switching network 300, to output point 706-1 of Clos switching network 700. Therefore, the test result in step 610 is YES, and steps 615 and 620 are repeatedly executed, until it is determined that center stage switch 301-3 can support the connection from input point 703-3 to output point 306-6. When the test result in step 620 is YES, i.e., when center stage switch 701-3 has been obtained, step 625 will cause the connection from input point 703-3 of Clos switching network 700, through center stage switch 701-1 to output point 706-6 of Clos switching network 700, to be taken down, and in its place, a connection is established from input point 703-3 through center stage switch 703-3 to output point 706-6. Since both the input and output points of center stage switch 301-1 that are necessary for the establishment of the initial point-to-point connection of the broadcast are available, the connection between input point 703-1 and output 306-1 is established, in step 585. The test result in step 530 is YES, because there are additional output points to be added to the broadcast. Control is passed back to step 503, which selects output point 706-2, of Clos switching network 700, to be added to the broadcast.

Since this is not a new broadcast, the test result in step 505 is NO. Control is then passed to step 515, which determines that center stage 701-1 is associated with the broadcast. The test result in step 520 is NO, because the signal to be broadcast has not been supplied to any input point of output stage switch 709-2. Since output point 718-3, of center stage switch 701, is available, the test result in step 540 is YES and the necessary bridge to output stage switch 709-2 is established in center stage switch 701-1, in step 125.

The algorithm continues, as described above, selecting output point 306-3, in step 503. The test result in step 540, however, is NO, because output point 718-4, of center stage switch 701-1, is being used to support a point-to-point connection from input point 703-4, of Clos switching network 700, to output point 306-7, of Clos switching network 700. Therefore, the process cycles through steps 545 and 550 to search, as described in steps 595 and 600, for a center stage switch which can support the point-to-point connection from input point 703-4 to output point 706-7. The test result in step 550 is YES only when the center stage switch obtained in step 545 is center stage switch 701-31. Step 555 takes down the connection from input point 703-4, of Clos switching network 700, through center stage switch 701-1 to output point 706-7, of Clos network 700 and in its place establishes a connection from input point 703-4 through center stage switch 701-31 to output point 706-7. Step 525 establishes the necessary bridging at center stage switch 701-1 so that output point 706-3 is also connected to the signal supplied at input point 703-1.

Again, the process continues as described above, with output point 6-4 being selected in step 503. Since the signal from input point 703-1 of Clos switching network 700 is already being supplied to output stage switch 709-2, so that it may be supplied to output point 706-2, of Clos switching network 700, the necessary bridge to supply the signal from input point 703-1 to output 706-4 can be established in output stage switch 309-2. Therefore, the test result in step 520 is YES and the necessary bridge is established in step 525. Since all the output points supplied to step 501 have been incorporated into the broadcast, the test result in step 530 is NO, and the process is exited at step 535.

If it was desired to add a further broadcast, from input point 703-5, of Clos switching network 700, to output points 706-8 and 706-9, of Clos switching network 700, the process would be invoked and executed as described above until conditional branch point 560 was reached. Since there are already 31 broadcasts connection through Clos switching network 700 the test result in step 560 would be NO, in accordance with an aspect of the invention. Control is passed to step 565, whereby the operator of Clos switching network 565 is informed that all the resources are busy and that the requested broadcast can not be established. The process is then exited in step 570.

In an alternate embodiment of the invention as shown in FIG. 5, instead of rerouting the point-to-point connections immediately to a center stage switch to which they can be moved, the point- to-point connections which are to be moved can be marked and only moved immediately prior to establishing the broadcast. In another embodiment, the selection of the initial center stage that is to be associated with the broadcast can be selected from those available center stages so as to minimize the number of connections that need to be moved when establishing the broadcast. Due to the nature of the interconnection pattern in space division Clos switching networks, the number of switches in the center stage can be determined from the number of output points on each switch of the input stage or the number of input points on each switch of the output stage.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in establishing a plurality of point-to-multipoint broadcast connections of signals by bridging multiple connections onto said signals, said signals being supplied as inputs to a Clos switching network having at least an input switching stage, a center switching stage and an output switching stage, said center switching stage having a predetermined number of switches, the method characterized by:
   limiting the number of point-to-multipoint connections that can be established in said Clos switching network to the number of switches in the center switching stage in said network; and
   disallowing any bridging onto any of said signals at said input switching stage.

2. A method for use in establishing a broadcast connection of a signal by bridging multiple connections from said signal in a Clos switching network having at least an input switching stage, a center switching stage and an output switching stage, each of said switching stages having a predetermined number of switches, each of said switches having input points and output points, said signal being supplied as an input to a predetermined input point of one of said switches of said input switching stage and said broadcast connection causing said signal to be supplied as an output from predetermined ones of said output points of said switches of said output switching stage, the method comprising the steps of:
   selecting one of said predetermined output points;
   connecting said signal from said predetermined input point to the selected output point through a switch of said center stage which has no broadcast connections passing through it;
   performing the following steps for each one of the predetermined output points which remains unselected, on an output-point-by-output-point basis, until each output point is connected to said signal, the steps including
   a. selecting one of said predetermined output points from which said signal is to be supplied which has not been previously selected;
   b. connecting the signal to said selected output point by bridging said selected output point to said signal at the particular switch of the output stage having the selected output point if a bridged connection to said signal can be established from any input point of said particular switch;
   c. rerouting from said available switch of said center stage to another switch of said center stage any point-to-point connection that is passing through the output point of said available switch and is connected to an input point of said particular switch if such a point-to-point connection exists;
   d. bridging the signal, at said available switch, to the output point of said available switch that is connected to an input point of said particular switch; and
   e. connecting said input point of said particular switch to said selected output point.

3. The invention as described in claim 2 wherein the first of said connecting steps includes the step of:
    finding a switch in said center stage which has no broadcast connections passing through it.

4. The invention as described in claim 3 wherein said step of finding includes the steps of:
    determining whether there is or is not a switch of said center stage that does not have a broadcast connection passing though it; and
    exiting said method if it is determined that there is no switch of said center stage that does not have a broadcast connection passing though it.

5. The invention as described in claim 3 further including the steps of:
    searching for a switch of said center stage that does not have a broadcast connection passing through it if it is determined that there is a switch of said center stage that does not have a broadcast connection passing though it.

6. The invention as described in claim 4 wherein said step of determining includes the steps of:
    making a comparison between the number of broadcast connections already established with the number of said switches of said center stage; and
    determining that there is no switch of said center stage that does not have a broadcast connection passing though it if the result of said comparison is that there are already established the same number of broadcast connections as there are switches in said center stage.

7. The invention as described in claim 6 further including the step of:
    determining that there is an switch in said center stage that does not have a broadcast connection passing though it if the result of said comparison is that there are already established less broadcast connections than there are switches in said center stage.

8. A method for us in a Clos switching network having at least an input switching stage, a center switching stage and an output switching stage, said center switching stage having a predetermined number of switches, the method comprising the step of
    establishing a plurality of point-to-midpoint broadcast connections within said network by bridging multiple connections onto signals supplied as inputs to said network,
    said establishing step characterized in that
    the number of point-to-multipoint connections that can be established in said three-stage Clos switching network is limited to the number of switches in said center switching stage and in that any bridging onto any of said signals at said input switching stage is disallowed.

9. A method for use in establishing a plurality of point-to-multipoint broadcast connections of signals by bridging multiple connections onto said signals, said signals being supplied as inputs to a Clos switching network having at least an input switching stage, a center switching stage and an output switching stage, each of said switching stages having a predetermined number of switches and each switch of said output switching stage having the same predetermined number of input points for receiving said signals from said center stage, the method characterized by:
    limiting the number of point-to-multipoint connections that can be established in said Clos switching network to the number of input points of each switch of the output switching stage; and
    disallowing any bridging onto any of said signals at said input switching stage.

10. A method for use in adding additional predetermined output points to a broadcast connection of a signal by bridging in a Clos switching network having at least an input switching stage, a center switching stage and an output switching stage, each of said switching stages having predetermined numbers of switches, each of said switches having input points and output points, said signal being supplied as an input to a predetermined input point of one of said switches of said input switching stage and said broadcast connection causing said signal to be supplied as an output from predetermined ones of said output points of said switches of said output switching stage, the method comprising the steps of:
    selecting one of said predetermined output points from which said signal is to be supplied which has not been previously selected;
    making a determination if the signal is supplied to at least one input point of the signal at the particular switch of the output stage having the selected output point;
    supplying the signal to an input point of the particular switch without bridging at the input stage if the determination indicates that the signal is not supplied to any input of the particular switch;
    connecting the selected output point to the signal at the switch of the output stage connected to the selected output point.

11. A method for use in establishing a plurality of point-to-multipoint broadcast connections of signals by bridging multiple connections onto said signals, said signals beings supplied as inputs to a Clos switching network having at least an input switching stage, a center switching stage and an output switching stage, each of said switching stages having a predetermined number of switches and each switch of said input switching stage having the same predetermined number of output points for transmitting said signals to said center stage, the method characterized by:
    limiting the number of point-to-multipoint connections that can be established in said Clos switching network to the number of output points of each switch of the input switching stage; and
    disallowing any bridging onto any of said signals at said input switching stage.

12. Apparatus for use in establishing a plurality of point-to-multipoint broadcast connections of signals by bridging multiple connections onto said signals, said signals being supplied as inputs to a Clos switching network having at least an input switching stage, a center switching stage and an output switching stage, said center switching stage having a predetermined number of switches, the apparatus characterized by:
    means for limiting the number of point-to-multipoint connections that can be established in said Clos switching network to the number of switches in the center switching stage in said network; and
    means for disallowing any bridging onto any of said signals at said input switching stage.

13. Apparatus for use in establishing a broadcast connection of a signal by bridging multiple connections from said signal in a Clos switching network having at least an input switching stage, a center switching stage and an output switching stage, each of said switching stages having predetermined numbers of switches, each of said switches having input points and output points, said signal being supplied as an input to a predetermined input point of one of said switches of said input switching stage and said broadcast connection causing said signal to be supplied as an output from predetermined ones of said output points of said switches of said output switching stage, the method comprising the steps of:

means for selecting ones of said predetermined output points without replacement;

means for connecting said signal from said input point of the switch of said input switching stage to which it is supplied to an available switch of said center stage, said switch being available in that no broadcast connections are passing through it;

means for connecting the signal to said selected output point by bridging said selected output point to said signal at the particular switch of the output stage having the selected output point;

means for rerouting from said available switch of said center stage to another switch of said center stage any point-to-point connections that are either passing through the output point of said available switch that is connected to an input point of said particular switch or passing through the input point of said available switch that is connected to an output point of the switch of said input switching stage to which said signal is supplied;

means for bridging the signal, at said available switch, to the output point of said available switch that is connected to an input point of said particular switch;

means for connecting without bridging said input point of said particular switch to said selected output point; and means for controlling said means for selecting, said means for connecting to an available switch of said center stage, said means for connecting the signal to said selected output point by bridging, said means for rerouting, said means for bridging the signal, at said available switch and said means for connecting without bridging such that then umber of point-to-multipoint connections that can be established in said Clos switching network is limited to the number of switches in the center switching stage in said network and bridging onto any of said signals at said input switching stage is not permitted.

14. A method for use in establishing a plurality of point-to-multipoint broadcast connections of signals by bridging multiple connections onto said signals, said signals being supplied as inputs to a Clos switching network having at least an input switching stage, a center switching stage and an output switching stage, said center switching stage having a predetermined number of switches, the method characterized by:

setting the maximum number of point-to-multipoint connections that can be established in said Clos switching network equal to the number of switches in the center switching stage in aid network; and bridging onto any of said signals at only (i) said center switching stage of (ii) said output switching stage.

15. A method for use in establishing a plurality of point-to-multipoint broadcast connections of signals by bridging multiple connections onto said signals, said signals being supplied as inputs to a Clos switching network having at least an input switching stage, a center switching stage and an output switching stage, each of said switching stages having a predetermined number of switches and each switch of said output switching stage having a predetermined number of input points for receiving said signals from said center stage, the method characterized by:

setting the maximum number of point-to-multipoint connections that can be established in said Clos switching network equal to the number of input points of each switch of the output switching stage; and bridging onto any of said signals at only (i) said center switching stage or (ii) said output switching stage.

16. A method for use in establishing a plurality of point-to-multipoint broadcast connections of signals by bridging multiple connections onto said signals, said signals being supplied as inputs to a Clos switching network having at least an input switching stage, a center switching stage and an output switching stage, each of said switching stages having a predetermined number of switches and each switch of said input switching stage having the same predetermined number of output points for transmitting said signals to said center stage, the method characterized by:

setting the maximum number of point-to-multipoint connections that can be established in said Clos switching network equal to the number of output points of each switch of the input switching stage; and bridging onto any of said signals at only (i) said center switching stage or (ii) said output switching stage.

17. A method for use in establishing a plurality of point-to-multipoint broadcast connections of signals by bridging multiple connections onto said signals, said signals being supplied as inputs to a Clos switching network having at least an input switching stage, a center switching stage and an output switching stage, each of said switching stages having a predetermined number of switches and each switch of said center switching stage having the same predetermined number of output points for transmitting said signals to said output stage, the method characterized by:

blocking the establishment of any connection in said Clos switching network that results in more than one signal passing through any particular switch of said center stage being bridged onto a point-to-multipoint broadcast connection bridging onto any of said signals at only (i) said center switching stage or (ii) said output switching stage.

* * * * *